(12) United States Patent
Yi et al.

(10) Patent No.: US 11,231,720 B2
(45) Date of Patent: Jan. 25, 2022

(54) MOVING ROBOT AND CONTROL METHOD THEREOF

(71) Applicant: LG ELECTRONICS INC., Seoul (KR)

(72) Inventors: Sihyuk Yi, Seoul (KR); Jaehwan Ko, Seoul (KR); Hyukdo Kweon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 402 days.

(21) Appl. No.: 16/300,218

(22) PCT Filed: May 10, 2017

(86) PCT No.: PCT/KR2017/004843
§ 371 (c)(1),
(2) Date: Nov. 9, 2018

(87) PCT Pub. No.: WO2017/196084
PCT Pub. Date: Nov. 16, 2017

(65) Prior Publication Data
US 2019/0155299 A1    May 23, 2019

(30) Foreign Application Priority Data

May 10, 2016    (KR) .......................... 10-2016-0057182

(51) Int. Cl.
*B25J 5/00*    (2006.01)
*G05D 1/02*    (2020.01)
(Continued)

(52) U.S. Cl.
CPC .............. *G05D 1/0242* (2013.01); *A47L 9/28* (2013.01); *A47L 11/4011* (2013.01);
(Continued)

(58) Field of Classification Search
CPC . B25J 11/0085; B25J 19/06; B25J 5/00; B25J 9/1674; B25J 9/1676; G05D 1/0242;
(Continued)

(56) References Cited

U.S. PATENT DOCUMENTS 7,439,041 B2 * 10/2008 Michelitsch ....... G01N 33/6896
435/69.3
8,301,304 B2 * 10/2012 Jung ...................... G01B 11/24
700/254

(Continued)

FOREIGN PATENT DOCUMENTS

JP    2012-189479    10/2012
KR    10-2009-0019480    2/2009
(Continued)

OTHER PUBLICATIONS

Ghidary et al., A new home robot positioning system (HRPS) using IR switched multi ultrasonic sensors, 1999, IEEE, p. 737-741 (Year: 1999).*

(Continued)

*Primary Examiner* — Marc Mcdieunel
(74) *Attorney, Agent, or Firm* — KED & Associates LLP

(57) ABSTRACT

A moving robot comprises a floor sensing unit comprised of a plurality of transmitters, for which different sensing distances are set, and a single receiver, and, since a floor state is sensed using a plurality of sensors, it is possible to sense a normal floor states, an obstacle or a cliff present on a floor, and a long-distance state at a distance farther than the normal floor state, thereby preventing wrong sensing of a cliff due to an obstacle, and, since whether to keep traveling is set depending on the obstacle and a traveling speed is controlled, even an area previously not allowed to enter due to the wrong sensing may be cleaned and therefore a cleaning area may be increased.

33 Claims, 10 Drawing Sheets

(51) Int. Cl.
*A47L 9/28* (2006.01)
*A47L 11/40* (2006.01)
*B25J 11/00* (2006.01)
*B25J 19/02* (2006.01)

(52) U.S. Cl.
CPC ....... *A47L 11/4061* (2013.01); *B25J 11/0085* (2013.01); *B25J 19/021* (2013.01); *G05D 1/0238* (2013.01); *A47L 2201/04* (2013.01); *A47L 2201/06* (2013.01); *G05D 2201/0203* (2013.01)

(58) Field of Classification Search
CPC ............... G05D 1/0214; G05D 1/0238; G05D 2201/0203; G05D 2201/0215; G05D 1/0227; G05D 1/0255; G05D 1/0272; G01S 15/931; G01S 13/931; G01S 17/003; G01S 17/04; G01S 17/46; G01S 17/89; G01S 17/931; G01S 7/51; G01S 2015/938; G01S 7/521; B60Q 1/54; B60Q 9/008; B60Q 9/008; G06K 9/00664; G06K 9/00771; G06K 9/00805; G06K 9/2036; G06K 9/209; G06K 9/6212; G06K 9/6215; Y10S 901/01; A47L 11/4061; A47L 11/4066; A47L 2201/04
See application file for complete search history.

(56) References Cited

U.S. PATENT DOCUMENTS

| | | | |
|---|---|---|---|
| 8,788,092 | B2 | 7/2014 | Casey et al. |
| 9,798,328 | B2* | 10/2017 | Vicenti .............. A47L 11/4061 |
| 10,296,007 | B2* | 5/2019 | Vicenti .............. A47L 11/4061 |
| 2009/0157225 | A1* | 6/2009 | Jung ...................... G01B 11/24 |
| | | | 700/250 |
| 2015/0260845 | A1 | 9/2015 | Takemura et al. |
| 2016/0320777 | A1* | 11/2016 | Yun ...................... G05D 1/0088 |

FOREIGN PATENT DOCUMENTS

| | | |
|---|---|---|
| KR | 10-1412581 | 6/2014 |
| KR | 10-1495866 | 2/2015 |
| KR | 10-2015-0106325 | 9/2015 |

OTHER PUBLICATIONS

Muneer et al., A novel automated site survey system, 2006, IEEE, p. 1-4 (Year: 2006).*
Lee et al., Floor-types Identification Method for Wheel Robot Using Impedance Variation, 2009, IEEE, p. 2340-2343 (Year: 2009).*
International Search Report (with English Translation) and Written Opinion dated Aug. 25, 2017 issued in Application No. PCT/KR2017/004843.

* cited by examiner

MOVING ROBOT AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2017/004843, filed May 10, 2017, which claims priority to Korean Patent Application No. 10-2016-0057182, filed May 10, 2016, whose entire disclosures are hereby incorporated by reference.

TECHNICAL FIELD

The present invention relates to a moving robot and a control method thereof, and more particularly to a moving robot capable of controlling operation by sensing a floor during traveling and a control method thereof.

The present invention relates to

BACKGROUND ART

A moving robot is an apparatus capable of traveling in an area to clean and performing cleaning by suctioning foreign substances such as dust from a floor.

The moving robot is provided with a chargeable battery and capable of freely moving on its own using power of the battery, and performs cleaning by suctioning foreign substances present on a floor during traveling and returns back to a charging station to charge the battery, when necessary.

In general, such a moving robot performs an obstacle avoidance operation by sensing a distance to an obstacle, such as furniture, an office device, and a wall in the travel area, and controlling driving of a left wheel and a right wheel.

In addition, the moving robot senses a cliff, such as a stair, and travels by avoiding the obstacle. For example, U.S. Pat. No. 8,788,092B2 discloses the feature of sensing a cliff based on an amount of infrared light received after being emitted toward a floor.

However, a moving robot having this feature is allowed to sense simply whether a cliff is present ahead, but, since a floor is not flat in an ordinary home condition, the feature of detecting whether a cliff is present ahead is not enough to be applied to an actual home condition. For example, various obstacles such as a carpet, a small toy, and a door threshold are present on the floor, but each of the obstacles cannot be distinguished.

For example, in the case where a moving robot is tilted when moving over a door threshold, the moving robot may temporarily sense the door threshold as a cliff. If the door threshold is sensed as a cliff, the moving robot does not enter a room with the door threshold, and therefore, the room cannot be cleaned.

RELATED ART DOCUMENT

Patent Document

U.S. Pat. No. 8,788,092B2

DISCLOSURE

Technical Problem

The present invention provides a moving robot capable of controlling traveling by sensing a floor state with a plurality of sensors and a control method thereof.

Technical Solution

In one general aspect of the present invention, there is provided a moving robot including: a movable main body; a travel drive unit configured to move the main body; a floor sensing unit comprising a plurality of transmitters for transmitting signals set with different sensing distances toward a floor and a single receiver for receiving any one of the signals transmitted from the plurality of transmitters, and configured to sense a state of the floor; and a controller configured to control the travel drive unit by changing a travel setting in accordance with a floor sensing signal received from the floor sensing unit, and the floor sensing unit is further configured to, when the signals are respectively transmitted from the plurality of transmitters toward the floor, determine the state of the floor by calculating a distance from a bottom surface of the main body to the floor in response to a signal which is reflected and then incident on the receiver.

The receiver may include a first sensor configured to sense incidence of any one of the signals transmitted from the plurality of transmitters. The plurality of transmitters may include a third sensor that is installed such that, when a signal is reflected within a first distance to a second distance from the bottom surface of the main body, the signal is incident on the receiver. The floor sensing unit may be further configured to, when a signal transmitted from the third sensor is incident on the receiver, determine that the state of the floor is a flat floor. The moving robot may further include a second sensor that is installed such that, when a signal is reflected within a third distance to a fourth distance each shorter than the second distance, the signal is incident on the receiver. The floor determination unit may be further configured to, when a signal transmitted from the second sensor is incident on the receiver, determine that an obstacle is present on the floor.

The moving robot may further include a fourth sensor that is installed such that, when a signal is reflected within a fifth distance to a sixth distance each shorter than the second distance from the bottom surface of the main body, the signal is incident on the receiver. The floor sensing unit may be further configured to, when a signal transmitted from the fourth sensor is incident on the receiver, determine that a floor is located at a long distance or that the main body is tilted.

The floor sensing unit may be further configured to, when a signal from the second sensor is incident while a signal from the third sensor is incident on the receiver, determine that an obstacle is present on a flat floor. The floor sensing unit may be further configured to, when a signal from the fourth sensor is incident while a signal from the third sensor is incident on the receiver, determine that the main body is tilted or that a long-distance floor is formed. The floor sensing unit may be further configured to, when a signal from the third sensor is incident while a signal from the second sensor is incident on the receiver, determine that the moving robot arrives at a flat floor after moving over an obstacle.

The floor sensing unit may be further configured to, when a signal from the third sensor is incident while a signal from the fourth sensor is incident on the receiver, determine that the main body returns back to a normal state. The floor sensing unit may be further configured to, when a signal from the second sensor and a signal from the fourth sensor is incident sequentially while a signal from the third sensor is incident on the receiver, determine that the main body is tilted by an obstacle present on a flat floor.

The first sensor may be a photodiode, and the plurality of transmitters may include light emitting diodes.

The floor sensing unit may further include a sensor case which protects the plurality of transmitters and the receiver, and which is provided with a guide such that the signals transmitted from the plurality of transmitters respectively form predetermined angle relative to the floor. The plurality of transmitters may be installed at different angles relative to the floor.

The receiver may be further configured to, when a signal transmitted from any one of a second sensor, a third sensor, and a fourth sensor included in the plurality of transmitters is incident on the first sensor, input the floor sensing signal to the controller. The second sensor, the third sensor, and the fourth sensors included in the plurality of transmitters sequentially may operate in a predetermined order. The controller may be further configured to, when any of the signals transmitted from the plurality of transmitters is not sensed by the receiver, determine that the state of the floor is a cliff.

The controller may be further configured to: when it is determined in accordance with the floor sensing signal that the state of the floor is one of an obstacle, a flat floor, and a long-distance state, maintain a travel setting; and when it is determined that the state of the floor is a cliff, change a direction of travel.

The floor sensing unit may include: a first floor sensing unit installed at a front lower end of the main body; a second floor sensing unit installed at a right lower end of the main body; and a third floor sensing unit installed at a left lower end of the main body, each of the first to third floor sensing units may include the receiver and the plurality of transmitters, and the controller may be further configured to determine a state of a floor around the main body in accordance with a floor sensing signal received from each of the first to third floor sensing units.

The controller may be further configured to generate an operating signal and transmit the operating signal to any one of the first to third floor sensing units such that the first to third floor sensing units operate sequentially. The controller may be further configured to, when a cliff is sensed by a floor sensing signal from any one of the first to third floor sensing units, set a direction of travel by determining a position of the cliff based on positions of the first to third floor sensing units.

The controller may include a floor determination unit configured to control the floor sensing unit and determine the state of the floor in accordance with the floor sensing signal, and the floor determination unit may include: a micro control unit (MCU) configured to apply an operating signal to the floor sensing unit; a multiplexer (MUX) configured to select any one of the first to third floor sensing units and apply the operating signal to the selected floor sensing unit; and a signal processing unit configured to filter noise in a sensing signal received from the receiver, convert the sensing signal into a digital signal, and input the digital signal to the MCU.

In another general aspect of the present invention, there is provided a control method of a moving robot, the control method including: a during traveling, transmitting signals for sensing a state of a floor from a plurality of transmitters set with different sensible distances; when the signals from the plurality of transmitters are sensed by a receiver, inputting a floor sensing signal; in accordance with the floor sensing signal, determining that the state of the floor is one of a flat floor, an obstacle, a long-distance state, a cliff depending on a distance to the floor; and, when the cliff is determined in correspondence with the state of the floor, change a direction of travel, and when the state of the floor is not the cliff, travel with maintaining a travel setting even though the distance to the floor is equal to or greater than a predetermined distance.

The control method may further include, when a signal from the plurality of transmitters installed at different angles is received by the receiver, determining which sensor from among second to fourth sensors included in the plurality of transmitters has transmitted the signal, and the floor sensing signal may be input by sensing a distance from a main body to the floor in correspondence with the sensor which has transmitted the signal.

The control method may further include transmitting the signal as the second to fourth sensors included in the plurality of transmitters operate sequentially in a predetermined order in accordance with an input operating signal. The control method may further include, when the signal from the plurality of transmitters are not sensed by the receiver, determining that the state of the floor is the cliff.

The control method may further include: when a signal from the third sensor is incident on the receiver, determining that the state of the floor is the flat floor; when a signal from the second sensor is incident on the receiver, determining that an obstacle is present on the floor; and when a signal transmitted from the fourth sensor is incident on the receiver, determining that the floor is located at a long distance or that the main body is tilted.

The control method may further include: when the signal from the second sensor is incident while the signal from the third sensor is incident on the receiver, determining that an obstacle is present on a flat floor; when the signal from the fourth sensor is incident while the signal from the third sensor is incident on the receiver, determining that the main body is tilted by an obstacle or that a long-distance floor is formed; when the signal from the third sensor is incident while the signal from the second sensor is incident on the receiver, determining that the moving robot arrives at a flat floor after moving over an obstacle; when the signal from the third sensor is incident while the signal from the fourth sensor is incident on the receiver, determining that the main body returns back to a normal state; and when the signal from the second sensor and the signal from the fourth sensor are incident sequentially while the signal from the third sensor is incident on the receiver, determining that the main body is tilted by an obstacle present on a flat floor.

The control method may further include: receiving the floor sensing signal from first to third floor sensing units installed at a plurality of positions; in accordance with the floor sensing signal received from the first to third floor sensing units, determining a state of a surrounding floor, wherein each of the first to third floor sensing units comprises the receiver including a first sensor, and the plurality of transmitters including second to fourth sensors.

The control method may further include: in accordance with an operating signal applied to any one of the first to third floor sensing units, sequentially operating the first to third floor sensing units. The control method may further include: when the cliff is determined by the floor sensing signal, determining a position of the cliff in correspondence with a position of a module from which the floor sensing signal has been received among the first to third floor sensing units, and setting a direction of travel.

Advantageous Effects

In embodiments of the moving robot and the control method thereof according to the present invention, not just a normal state of a floor, the presence of an obstacle or cliff on the floor, but also a long-distance state farther than the normal state of the floor are sensed, so that wrong detection of a cliff due to presence of an obstacle is prevented, and whether to keep traveling may be determined depending on the obstacle and a traveling speed may be controlled accordingly, so that the moving robot is able to enter an area not allowed to enter due to the wrong detection and thus a cleaning area may increase.

BEST MODE

Figure 1:
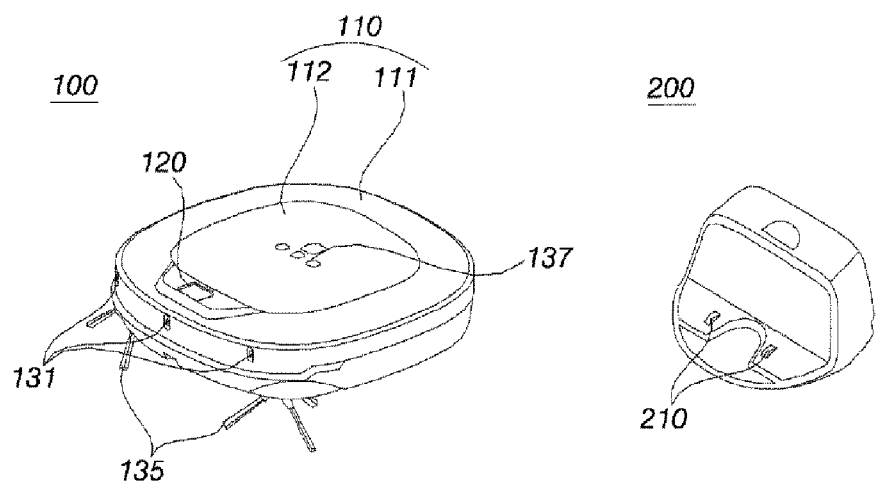
FIG. 1 is a perspective view illustrating a moving robot and a charging station for charging the moving robot according to an embodiment of the present invention.

Advantages and features of the present invention and a method of achieving the same will be clearly understood from embodiments described below in detail with reference to the accompanying drawings. However, the present invention is not limited to the following embodiments and may be implemented in various different forms. The embodiments are provided merely for complete disclosure of the present invention and to fully convey the scope of the invention to those of ordinary skill in the art to which the present invention pertains. The present invention is defined only by the scope of the claims. In the drawings, the thickness of layers and regions may be exaggerated for clarity. Throughout the drawings, like numbers refer to like elements. A moving robot may be implemented by one or more processors or by a hardware device.

Hereinafter, embodiments of the present invention will be described in detail with reference to the accompanying drawings.

Figure 2:
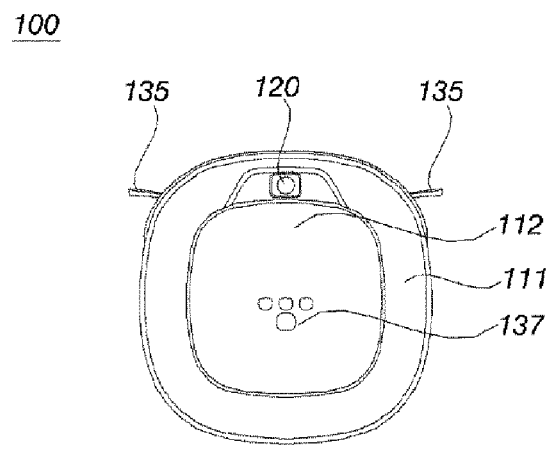
FIG. 2 is a view illustrating an top part of the moving robot illustrated in FIG. 1.
Figure 3:
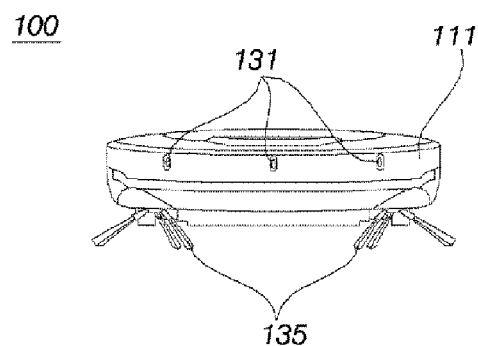
FIG. 3 is a view illustrating a front part of the moving robot illustrated in FIG. 1.
Figure 4:
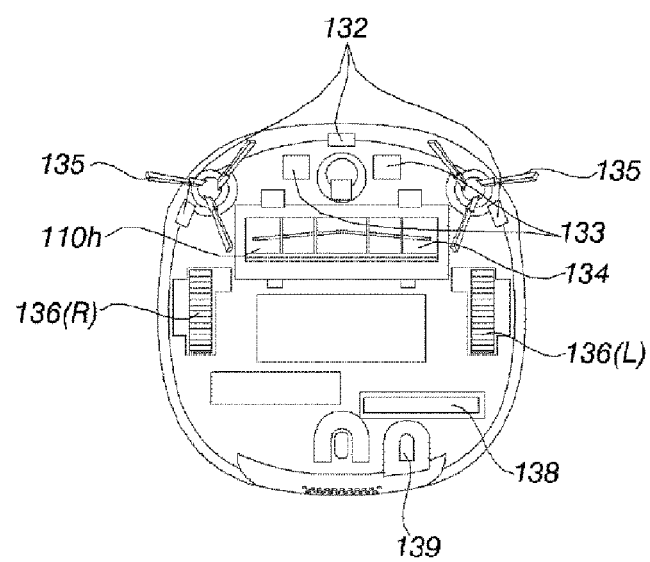
FIG. 4 is a view illustrating a bottom part of the moving robot illustrated in FIG. 1.

FIG. 1 is a perspective view illustrating a moving robot and a charging station for charging the moving robot according to an embodiment of the present invention, FIG. 2 is a view illustrating an top part of the moving robot illustrated in FIG. 1, FIG. 3 is a view illustrating a front part of the moving robot illustrated in FIG. 1, and FIG. 4 is a view illustrating a bottom part of the moving robot illustrated in FIG. 1.

As illustrated in FIGS. 1 to 54, the moving robot 100 includes a main body 110, and an image acquisition unit 120 for acquiring images of the surroundings of the main body 110. Hereinafter, as to defining each part of the main body 110, a portion facing a ceiling in a travel area is defined as an top part (see FIG. 2), a portion facing a floor in the travel area is defined as a bottom part (see FIG. 4), and a portion facing a forward direction of travel in the circumference of the main body 110 between the top part and the bottom part is defined as a front part (see FIG. 3).

The moving robot 100 includes a travel drive unit (not illustrated) for moving the main body 110. The travel drive unit includes at least one driving wheel 136 for moving the main body 110. The travel drive unit includes a motor that is connected to the driving wheels 136 to rotate the driving wheel. The driving wheel 136 may be provided on the left side and the right side of the main body 110. A driving wheel on the left side of the main body 110 is a left wheel 136(L), and a driving wheel on the right side of the main body 110 is a right wheel 136(R).

The left wheel 136(L) and the right wheel 136(R) may be driven by a single motor, but, when necessary, a left wheel motor for driving the left wheel 136(L) and a right wheel motor for driving the right wheel 136(R) may be provided individually. A direction of travel of the main body 110 may be changed to the left or to the right by differentiating a speed of rotation of the left wheel 136(L) and the right wheel 136(R).

A suction port 110h to suction air may be formed on the bottom part of the main body 110, and the main body 110 may be provided with a suction device (not illustrated) to provide suction force to cause air to be suctioned through the suction port 110h, and a dust container (not illustrated) to collect dust suctioned together with air through the suction port 110h.

The main body 110 may include a case 111 defining a space to accommodate various components of the moving robot 100. An opening allowing insertion and retrieval of the dust container therethrough may be formed on the case 111, and a dust container cover 112 to open and close the opening may be provided rotatably to the case 111.

There may be provided a roll-type main brush having bristles exposed through the suction port 110h and an auxiliary brush 135 positioned at the front of the bottom part of the main body 110 and having bristles forming a plurality of radially extending blades. Dust is separated from the floor in a travel area by rotation of the brushes 134 and 135, and such dust separated from the floor in this way is suctioned through the suction port 110h and collected in the dust container.

A battery 138 serves to supply power not only necessary for the motor but also for overall operations of the moving robot 100. When the battery 138 of the moving robot 100 is run out, the moving 100 may perform return travel to the charging station 200 to charge the battery, and during the return travel, the moving robot 100 may autonomously detect the position of the charging station 200.

The charging station 200 may include a signal transmitting unit (not illustrated) to transmit a predetermined return signal. The return signal may include, but is not limited to, an ultrasonic signal or an infrared signal.

The moving robot 100 may include a signal sensing unit (not shown) to receive the return signal. The charging station 200 may transmit an infrared signal through the signal transmitting unit, and the signal sensing unit may include an infrared sensor to sense an infrared signal. The moving robot 100 moves to the position of the charging station 200 in accordance with the infrared signal transmitted from the charging station 200 and docks with the charging station 200. By this docking, charging of the moving robot 100 is performed between a charging terminal 133 of the moving robot 100 and a charging terminal 210 of the charging station 200.

The image acquisition unit 120, which is configured to photograph the travel area, may include a digital camera. The digital camera may include at least one optical lens, an image sensor (e.g., a CMOS image sensor) including a plurality of photodiodes (e.g., pixels) on which an image is created by light transmitted through the optical lens, and a digital signal processor (DSP) to construct an image based on signals output from the photodiodes. The DSP may produce not only a still image, but also a video consisting of frames constituting still images.

Preferably, the image acquisition unit 120 is provided to the top part of the main body 110 to acquire an image of the ceiling in the travel area, but the position and capture range of the image acquisition unit 120 are not limited thereto. For example, the image acquisition unit 120 may be arranged to acquire a forward image of the main body 110.

In addition, the moving robot 100 may further include an obstacle sensor 131 to detect a forward obstacle. The moving robot 100 may further include a floor sensing unit 132 to detect the presence of a cliff on the floor within the travel area, a floor state, or the presence of an obstacle on the floor. In some cases, the floor sensing unit 132 may further include a lower camera sensor to acquire an image of the floor.

In addition, the moving robot 100 includes an operation unit 137 to input an on/off command or any other various commands. Through the operation unit 137, a variety of control commends necessary for overall operations of the moving robot 100 may be received. In addition, the moving robot 100 may include an output unit (not illustrated) to display reservation information, a battery status, an operation mode, an operation status, an error state, etc.

Figure 5:
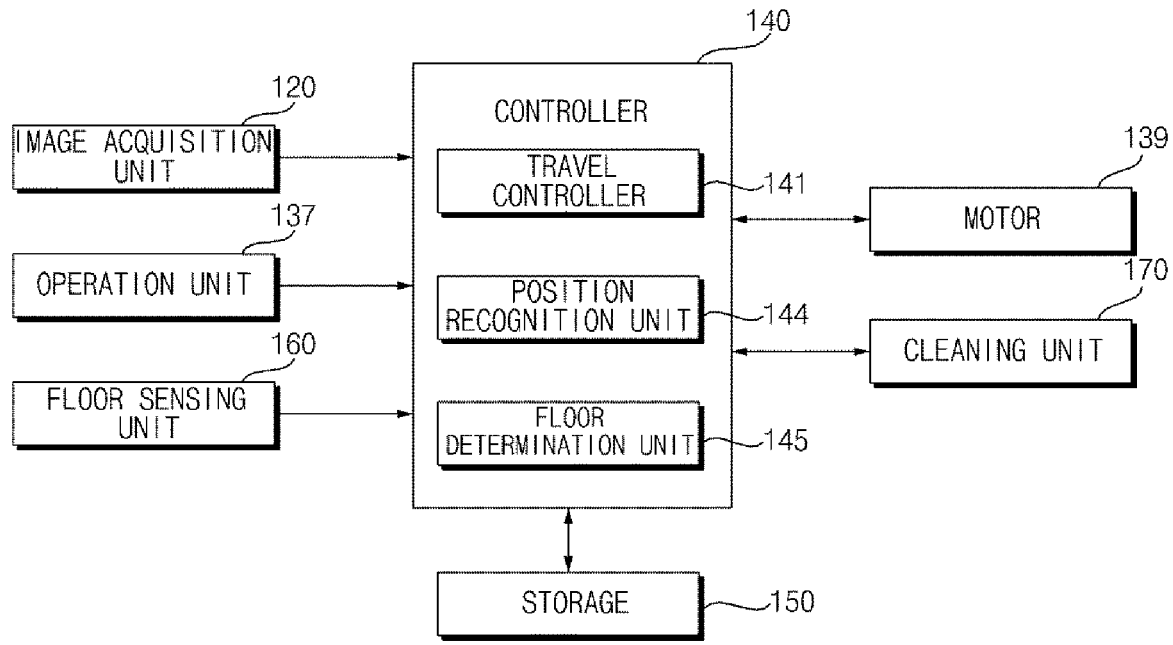
FIG. 5 is a block diagram illustrating a control relationship between major components of a moving robot according to an embodiment of the present invention.

FIG. 5 is a block diagram illustrating a control relationship between major components of a moving robot according to an embodiment of the present invention.

As described above, the moving robot 100 includes the image acquisition unit 120, the operation unit 137, the travel drive unit including the motor 139, and a cleaning unit 170 including the suction port 110h and the brush to perform cleaning by suctioning foreign substances.

Referring to FIG. 5, the moving robot includes a controller 140 for processing and determining a variety of information to recognize the current position, a storage 150 configured to store a variety of data, and the floor sensing unit 132 and 160 for sensing a state of a floor or an obstacle present on the floor. By including a controller, each component of the moving robot may be implemented by one or more processors or by a hardware device.

By controlling the image acquisition unit 120, the operation unit 137, the motor 139, the cleaning unit 170, and the floor sensing unit 160 of the moving robot 100, the controller 140 controls overall operations of the moving robot 100.

The storage unit 150 records a variety of information required to control the moving robot 100 and may include a volatile or non-volatile recording medium. The recording medium stores data readable by a micro processor, and may include a Hard Disk Drive (HDD), a Solid State Disk (SSD), an Silicon Disk Drive (SDD), a ROM, a RAM, a CD-ROM, a magnetic tape, a floppy disk, an optical data storage device, etc.

The storage 150 stores an operation mode of the moving robot 100, data sensed during traveling, and data on moving distance and path travelled by the moving robot, and the storage 150 also stores an acquisition image received through the image acquisition unit and data on a floor state or an obstacle on a floor received through the floor sensing unit 160.

In addition, the storage unit 150 may store a map of a travel area. The map may be a map received from an outside or may be a map generated by the moving robot 100 through self learning. On the map, positions of rooms in the travel area may be indicated. In addition, the current position of the moving robot 100 may be indicated on the map, and the current position of the moving robot 100 on the map may be updated during traveling. An external terminal stores a map identical to the map stored in the storage 150.

The floor sensing unit 160 may be comprised of a plurality of sensors installed at the bottom of the moving robot 100. The floor sensing unit 160 may be installed at different positions. For example, the floor sensing unit 160 may be installed at a front lower end, a left lower end, and a right lower end of the moving robot 100 with reference to a forward direction of travel. In this case, the floor sensing unit 160 may be installed at a more outer position compared to a driving wheel.

The controller 140 controls the moving robot 100 to perform cleaning by moving in a travel area in accordance with a cleaning command received from an outside. The controller 140 operates the brush of the cleaning unit 170, and performs control such that dust is suctioned through the suction port.

The controller 140 includes a travel controller 141, a position recognition unit 144, and a floor determination unit 145.

The travel controller 141 serves to control traveling of the moving robot 100, and controls driving of the motor 139 according to a travel setting. The travel controller 141 controls the moving robot 100 to move to an area designated in accordance with a cleaning command and travel the corresponding area so that cleaning is performed by the cleaning unit 170.

In addition, the travel controller 141 may recognize a moving path of the moving robot 100 based on operation of the motor 139 and the driving wheel 136. For example, the travel controller 141 may recognize the current or previous moving speed, a distance travelled, etc. based on a speed of rotation of the driving wheel 136, and may also recognize the current or previous direction changing procedure based on a direction of rotation of each of the driving wheels 136(L) and 136(R).

The position recognition unit 144 determines a position of the moving robot 100 by analyzing data received from the image acquisition unit 120. The position recognition unit 144 may determine a position of the moving robot 100 by associating data received from the image acquisition unit 120, for example, an acquisition image, with a map.

In addition, the position recognition unit 144 receives data on a moving speed, a distance travelled, and a direction of travel in accordance with rotation of the driving wheel 136 from the travel controller 141, and determine a position of the moving robot 100 based on travel information of the moving robot 100. In addition, the position recognition unit 144 may update a position of the moving robot 100 on the map in correspondence with an actual position of the moving robot 100. The position recognition unit 144 may recognize a position of the moving robot 100 by combining an acquisition image and travel information.

Operation of the floor sensing unit 160 is controlled. The floor determination unit 145 controls a plurality of floor sensing units 160 to operate individually, and controls a plurality of sensors included in the floor sensing unit 160 to operate sequentially.

In addition, the floor determination unit 145 determines a floor state and an obstacle present on the floor by analyzing data received from the floor sensing unit 160, and inputs resultant data to the travel controller 141.

For example, the floor determination unit 145 may distinguish a normal floor, a carpet, a small obstacle, or a door threshold, a long-distance state, or a cliff. depending on a distance to the floor based on measured data The travel controller 141 determines whether to keep traveling or change a travel path, based on data received from the floor determination unit 145, and controls the motor 139 according to the determination. For example, in the case of a normal floor, a carpet, a small obstacle, a door threshold, and a long-distance state, the travel controller 141 controls the moving robot 100 to keep traveling, and, in the case of a cliff, the travel controller 141 controls the moving robot 100 to change a moving path.

Figure 6:
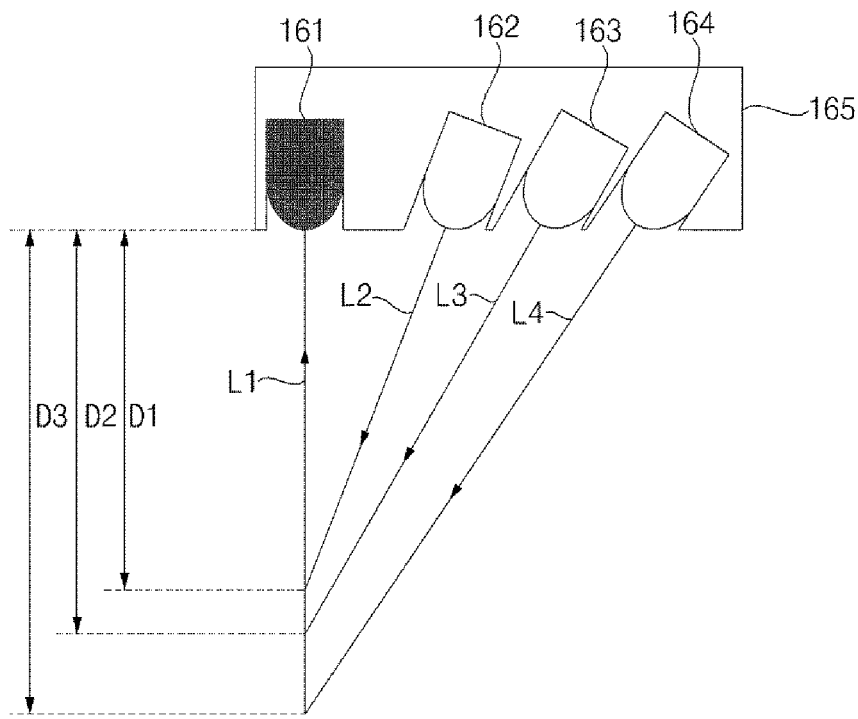
FIG. 6 is a diagram illustrating an example of a floor sensing unit of a moving robot according to the present invention.

FIG. 6 is a diagram illustrating an example of a floor sensing unit of a moving robot according to the present invention.

As illustrated in FIG. 6, the floor sensing unit 160 is comprised of a plurality of sensors 161 to 164.

The floor sensing unit 160 is comprised of a transmitter and a receiver.

The receiver includes a first sensor 161, and the transmitter includes second to fourth sensors 162 to 164. In addition, the floor sensing unit 160 includes a sensor case 165, which protects the first to fourth sensors and which is provided with a guide such that a transmitted signal travels in a predetermined direction. The receiver may further include a plurality sensors depending on a distance to sense.

The second to fourth sensors 162 to 164 serve as transmitters and transmit second to fourth signals L1 to L4. The second to fourth sensors 162 to 164 transmit signals sequentially under the control of the floor determination unit 145. For example, the second sensor 162 transmits a second signal L2, the third sensor 163 transmits a third signal L3, and then the fourth sensor 164 transmits a fourth signal L4. The second to fourth sensors 162 to 164 are installed at different angles and repeatedly transmit signals sequentially.

A first sensor 161 may employ a photodiode capable of sensing incident light, and the second to fourth sensors 162 to 164 may employ infrared light emitting diodes (IREDs).

Thus, the second to fourth signals L2 to L4 transmitted by the second to fourth sensors 162 to 164 are infrared rays, and the transmitted infrared rays are reflected by the floor and then incident into the first sensor 161 which is a photodiode.

When a signal is sensed as light is incident into the first sensor 161, the floor determination unit 145 may calculate a distance to the floor by determining that the signal is transmitted from which sensor from among the second to fourth sensors. That is, the floor determination unit 145 may control the second to fourth sensors 162 to 164 to sequentially operate and transmit signals, and hence, when a signal is sensed by the first sensor 161, the floor determination unit 145 may calculate a distance to the floor by determining that which sensor transmitted the signal right before.

The first to fourth sensors 161 to 164 of the floor sensing unit 160 are at different angles relative to the floor. As the sensors of the floor sensing unit 160 are installed at different angles, each sensor serves to sense an obstacle located at a different distance. The first to fourth sensors 161 to 164 of the floor sensing unit 160 serve to transmit signals at predetermined angles due to the sensor case 165.

The installation angles of the illustrated first to fourth sensors 161 to 164 may be changed, for example, depending on a distance to the floor to sense or a distance between the main body and the floor. It is preferable that the installation angles of the first to fourth sensors 161 to 164 are set in consideration of an angle of incidence and an angle of reflection.

The first sensor 161 is installed such that a reflected signal L1 of the second to fourth signals L2 to L4 transmitted from the second to fourth sensors is incident with respect to the floor.

The third sensor 163 is installed such that the third signal L3 is reflected at a second height D2 in correspondence with a distance between the main body and the floor and then incident on the first sensor. The second sensor 162 is installed such that the second signal L2 is reflected a first height D1 shorter than the distance between the main body and the floor and then incident into the first sensor. The fourth sensor 164 is installed such that a fourth signal L4 is reflected at a third height D3 longer than the second height D3 and then incident into the first sensor.

For example, the second sensor 162 is installed such that the signal L2 transmitted from the second sensor 162 is incident on the first sensor 161 when the signal L2 is reflected at a distance shorter than the distance between the main body and the floor, and hence, if the second signal is transmitted from the second sensor in the case of a flat floor, the second signal arrives at the second height D2 and then reflected, and accordingly, the second signal is not incident on the first sensor.

As such, when the floor is flat and there is no obstacle, the second to fourth signals from the second to fourth sensors 162 to 164 arrive at the second height D3 and are then reflected, respectively, and therefore, the second signal L2 and the fourth signal L4 are not incident on the first sensor 161 and only the third signal L3 from the third sensor, which is installed such that a signal reflected at the second height D2 is incident, is incident on the first sensor.

In addition, when an obstacle is present on the floor, the second signal is reflected and then incident on the first sensor. When a dent exists on the floor or when the main body is positioned over an obstacle, such as a door threshold, and thus a distance between the main body and the floor is increased, the fourth signal is incident on the first sensor. Meanwhile, when the main body is positioned on a stair edge, all of the second to fourth signals are not incident on the first sensor.

Thus, the floor sensing unit 160 inputs data on a floor state to the floor determination unit 145 by sensing, in phases, a signal depending on a distance between the floor and the main body.

The floor determination unit 145 determines a floor state by controlling operations of the second to fourth sensors 162 to 164 and, at the same time, using data on a signal incident on the first sensor. In addition, the floor determination unit 145 may determine a position of a cliff or an obstacle relative to the main body by receiving data from a plurality of floor sensing units. For example, the floor sensing unit 160 is installed on the front side, the right side, and the left side of the main body, thereby enabled to determine a direction in which a cliff is present out of a forward direction, a rightward direction, and a leftward direction with reference to a direction of travel.

Figure 7:
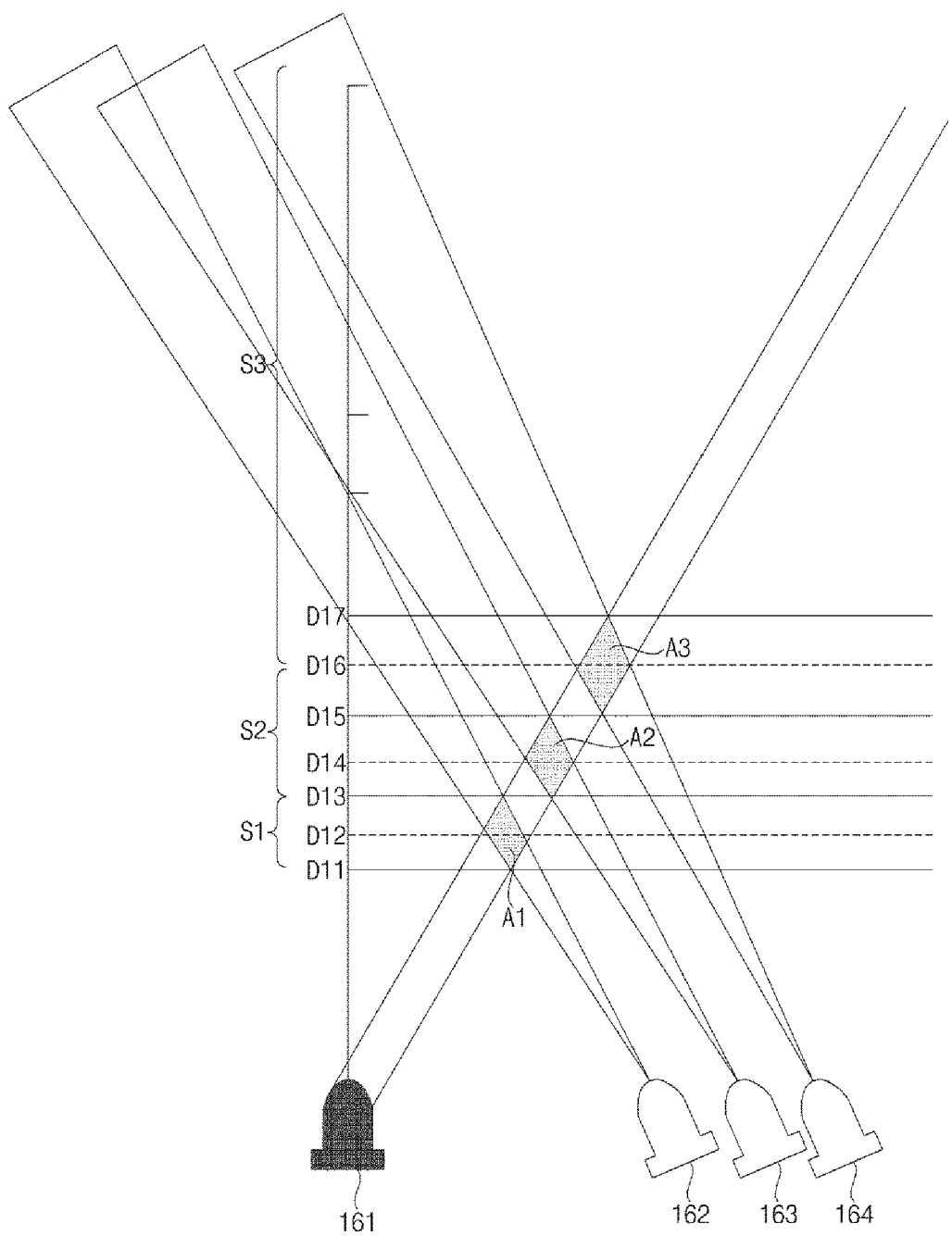
FIG. 7 is a diagram illustrating a sensing range of the floor sensing unit illustrated in FIG. 6.

FIG. 7 is a diagram illustrating a sensing range of the floor sensing unit illustrated in FIG. 6.

As illustrated in FIG. 7, the first to fourth sensors 161 to 164 are installed at different angles. Based on a sensing signal received from the first sensor, the floor determination unit 145 may distinguish an obstacle (S1), a floor (a normal state) (S2), a long-distance state, and a cliff depending on heights sensible by the second to fourth sensors 162 to 164. The related art determines both a long-distance state and a cliff as a cliff (S3), but the present invention senses the cliff and the long-distance state distinguishably.

The heights sensible by the second to fourth sensors 162 to 164 partially overlap, and the second to fourth sensors are installed such that an obstacle in a range between an eleventh to seventeenth heights D11 to D17 is sensed by the second to fourth sensors.

When the second signal transmitted from the second sensor 162 arrives at a first area A1, the second signal is reflected and then incident on the first sensor 161. In this case, a distance sensible by the second sensor 162, that is, a height from a bottom surface of the moving robot 100 to a reflecting object (the floor or an obstacle) falls within a range from the eleventh to thirteenth heights D11 to D13, the range which corresponds to the first area A1. The above-described first height D1 is included in the range from the eleventh to thirteenth heights D11 to D13.

When the third signal transmitted from the third sensor 163 arrives at a second area A2, the third signal is reflected and then incident on the first sensor 161. In this case, a distance sensible by the third sensor 163, that is, a height from a bottom surface of the moving robot 100 to a reflecting object (the floor or an obstacle), falls within a range from the thirteenth to fifteenth heights D13 to D15, the range which corresponds to the second area A2. The above-described second height D2 included in the range from the thirteenth to fifteenth heights D13 to D15.

When the fourth signal transmitted from the fourth sensor 164 arrives at a third area A3, the fourth signal is reflected and then incident on the first sensor 161. In this case, a distance sensible by the fourth sensor 164, that is, a height from the bottom surface of the moving robot 100 to a reflecting object (the floor or an obstacle) falls within a range from the fifteenth to seventeenth heights D15 to D17, the range which corresponds to the third area A1. The above-described third height D3 is included in the range from the fifteenth to seventeenth heights D15 to D17. The fourth sensor 164 senses a position much lower than a normal state of a floor, that is, a long-distance state at a predetermined distance from the sensor of the moving robot.

An object located farther than the seventeenth height D17, which is the maximum height sensible by the fourth sensor 164, is not allowed to be sensed by the fourth sensor. The floor determination unit 145 determines that a distance not sensible by the fourth sensor is a cliff.

In this case, size of the first to third areas A1 to A3 may be determined by a field of view of the first sensor and may change depending on characteristics of the first sensor.

For example, in the case where the moving robot 100 is in a normal state, that is, in the case where the moving robot 100 is positioned on a flat floor, suppose that a height from the floor to a sensor is 33: in this case, when the moving robot 100 encounters a door threshold, the height from the floor to the sensor is determined ranging from 28 to 8, and, when the height greater than 58 is measured, it is determined that a cliff is present.

Considering a range of error, the second sensor 162 may be installed to sense a door threshold in a measurement range from 8 to 28, the third sensor 163a may be installed to sense a normal state in a measurement range from 28 to 38, and the fourth sensor 164 may be installed to perform sensing in a measurement range from 38 to 58.

When nothing is sensed by any one of the second to fourth sensors, the floor determination unit 145 determines that a cliff is present. In addition, the floor determination unit 145 allows signals from the third sensor and the fourth sensor to be sensed simultaneously with respect to the fifteenth height D15, such that a normal state is distinguished. For example, in the case where the moving robot 100 moves up and down from a door threshold, there is a change in a distance to the floor, and, for this reason, a sensible height range is set so that a long-distance state, rather than a cliff, is determined in spite of the relatively long distance to the floor, and the moving robot is able to keep traveling so as to cross and pass the obstacle. Accordingly, it is possible to prevent a normal floor from being sensed as a cliff and allow the moving robot to keep traveling.

In this case, when signals from the third sensor and the fourth sensor are sensed simultaneously, the floor determination unit 145 determines a normal state, and, when only a signal from the fourth sensor is sensed, the floor determination unit 145 determines a long-distance state. With respect to the fourth sensor, the floor determination unit 145 determines a long-distance state of a height allowed to be travelled despite a distance equal to or greater than a predetermined value to the floor and causes a speed to be decreased by the travel controller 141, and, when no signal from any one of the second to fourth sensors is sensed, the floor determination unit 145 immediately determines presence of a cliff and inputs data to the travel controller 141 so as to immediately stop traveling of the moving robot 100.

Figure 8:
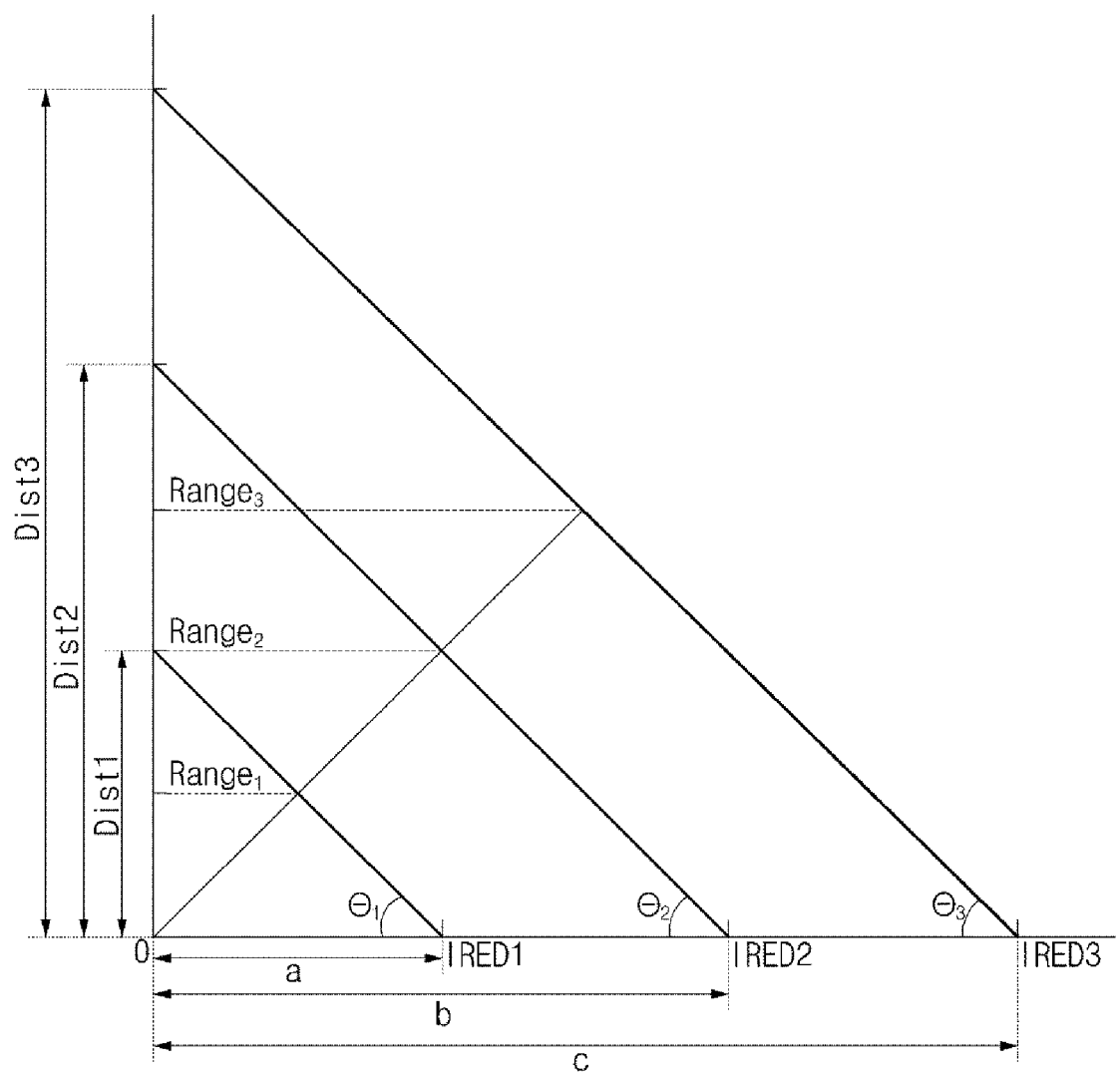
FIG. 8 is a diagram illustrating a method of installing sensors of the floor sensing unit illustrated in FIG. 6.

FIG. 8 is a diagram illustrating a method of installing sensors of the floor sensing unit illustrated in FIG. 6.

As illustrated in FIG. 8, the second to fourth sensors are installed at different angles so as to sense an object located at a height in a predetermined range, and, the first sensor is installed such that signals from the second to fourth sensors are incident on the first sensor when the signals are reflected at particular heights.

In this case, a sensible height is determined by a field of view of the first sensor.

Thus, a type of the first sensor and angles of installation of the second to fourth sensors may be set as below in consideration of a height to measure and a range of error.

$$\theta_1 = \tan^{-1} \frac{Dist_1}{Length_{LED1}}$$

$$\theta_2 = \tan^{-1} \frac{Dist_2}{Length_{LED2}}$$

$$\theta_3 = \tan^{-1} \frac{Dist_3}{Length_{LED3}}$$

Equation 1

In this case, a distance (a) from the first sensor 161 to the second sensor is LengthLED1, a distance (b) from the first sensor 161 to the third sensor is LengthLED2, and a distance (c) from the first sensor 161 to the fourth sensor is Length LE D3.

Accordingly, when it is assumed that a distance each of the second to fourth sensors to intersect the first sensor is Dist1, Dist2, and Dist3, a range Range1 sensible by the second sensor is Dist1/2, a range Range2 sensible by the third sensor is Dist2/2, and a range Range3 sensible by the fourth sensor is Dist3/2

When these are calculated in reverse, an angle of installation may be set depending on a sensible distance.

Figure 9:
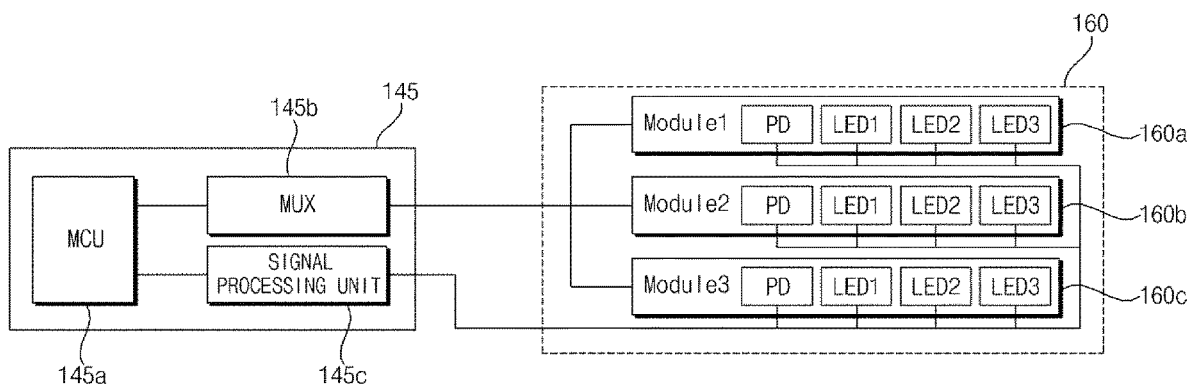
FIG. 9 is a diagram illustrating control configurations of the floor sensing unit illustrated in FIG. 6.

FIG. 9 is a diagram illustrating control configurations of the floor sensing unit illustrated in FIG. 6.

As described above, the floor sensing unit 160 is installed as a plurality of floor sensing units.

As illustrated in FIG. 9, the floor sensing unit 160 is comprised of a first floor sensing unit 160a, a second floor sensing unit 160b, and a third floor sensing unit 160c which are installed at different positions on a bottom surface of the moving robot 100. For example, the first floor sensing unit 160a may be installed at the front side of the bottom surface of the moving robot 100 in a direction of travel of the moving robot 100, the second floor sensing unit 160b may be installed at the right side of the bottom surface of the moving robot in the direction of the travel of the moving robot 100, and the third floor sensing unit 160c may be installed at the left side of the bottom surface of the moving robot 100 in the direction of travel of the moving robot 100.

The first to third floor sensing units 160a to 160c of the floor sensing unit 160 are respectively connected to the floor determination unit 145 such that operations of the first to third floor sensing units 160a to 160c are controlled, and sensed data is input to the floor determination unit 145.

The floor determination unit 145 is comprised of a micro control unit (MCU) 145a, a multiplexer (MUX) 145b, and a signal processing unit 145c.

The MCU 145a generates an operating signal required to operate sensors of the first to third floor sensing units 160a to 160c of the floor sensing unit 160, and applies the operating signal to the MUX 145b. In addition, in response to data received from the signal processing unit 145c, the MCU 145a may determine a state of a floor, that is, one of a normal state, an obstacle, a long-distance state, and a cliff.

The MCU 145a determines, based on the operating signal and sensing signals from the signal processing unit 145c, that a signal transmitted from which sensor is received as a sensing signal, and determines a state of the floor according to the determination. For example, when a sensing signal is received after operation of a second sensor, the MCU 145a may determine that an obstacle, such as a door threshold, is present on the floor.

In addition, based on sensing signals respectively received from the first to third floor sensing units 160a to 160c, the MCU 145a may determine a direction in which an obstacle or a cliff is present with reference to the direction of travel of the moving robot 100.

The MCU 145a inputs data on a sensing result to the travel controller 141, and the travel controller 141 may control the motor 139 by determining whether to keep traveling in accordance with a predetermined setting or whether to change a direction of travel.

The MUX 145b applies an operating signal to the first to third floor sensing units 160a to 160c of the floor sensing unit 160.

The MUX 145b selects any one of the first floor sensing unit, the second floor sensing unit, and the third floor sensing unit, and applies an operating signal to the selected floor sensing unit. The MUX 145b may select a module in the order of the first floor sensing unit, the second floor sensing unit, and the third floor sensing unit.

In this case, even in a single module of the floor sensing unit 160, the second to fourth sensors operate sequentially. In some cases, when signals transmitted from the second to fourth sensors are different, that is, when received signals are distinguishable, the second to fourth sensors may operate simultaneously. For example, in accordance with an operating signal, the floor sensing unit 160 may operate in a manner such that a second sensor of the first floor sensing unit, a second sensor of the second floor sensing unit, a second sensor of the third floor sensing unit, and a third sensor of the first floor sensing unit operate sequentially. In another example, in accordance with an operating signal, the floor sensing unit 160 may operate in a manner such that a second sensor of the first floor sensing unit, a third sensor of the second floor sensing unit, a fourth sensor of the third floor sensing unit, and a third sensor of the first floor sensing unit operate sequentially.

The signal processing unit 145c converts a sensing signal received from a first sensor, and inputs the converted signal to the MCU 145a. In addition, the signal processing unit 145c performs a filtering function with respect to a received sensing signal to remove light or noise, adjusts currents of the sensing signal, and converts the sensing signal, that is, an amount of light incident on the first sensor, into a digital signal.

Figure 10:
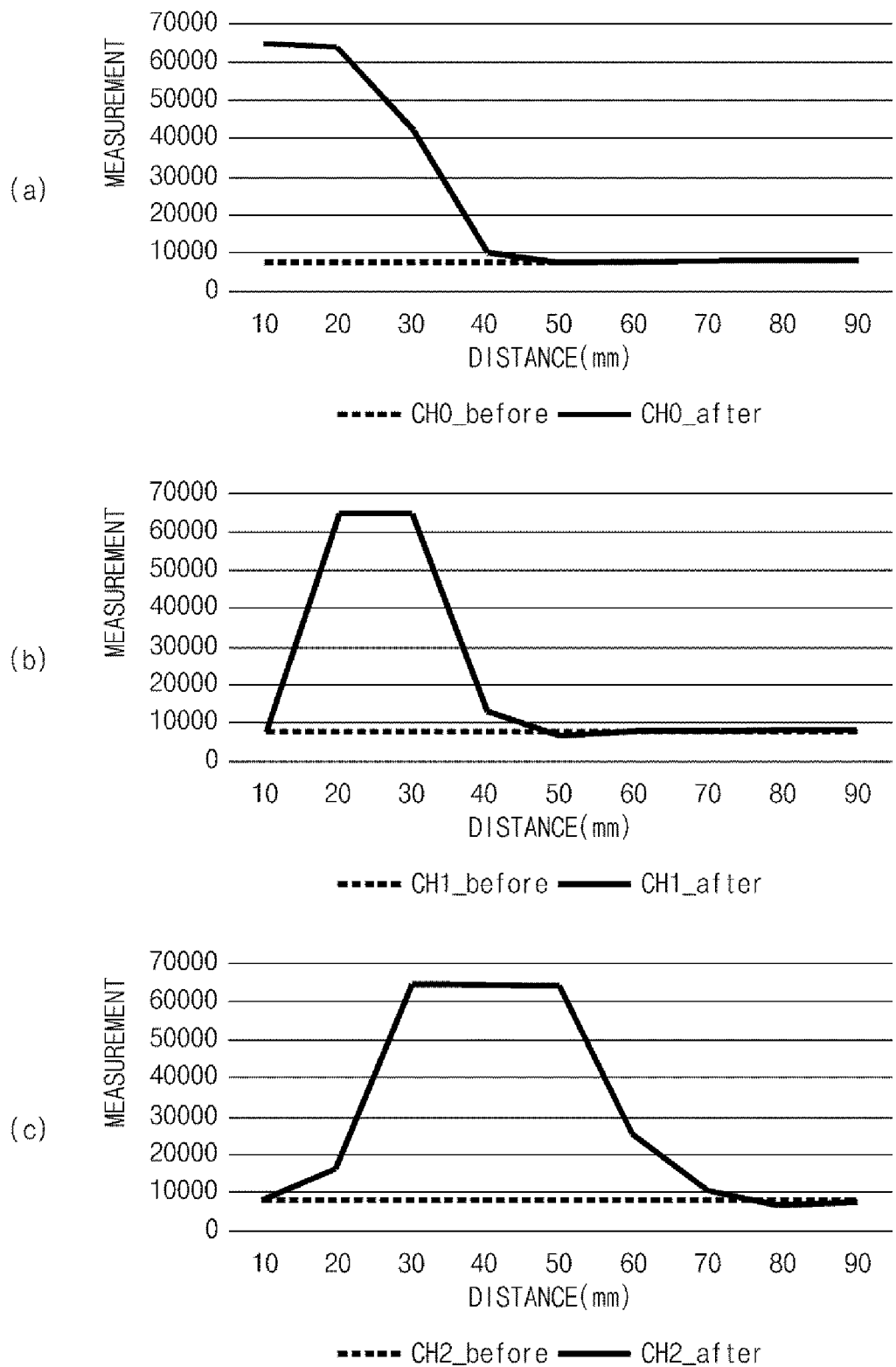
FIG. 10 is a diagram illustrating a sensing signal of the floor sensing unit illustrated in FIG. 6.

FIG. 10 is a diagram illustrating a sensing signal of the floor sensing unit illustrated in FIG. 6.

As illustrated in FIG. 10, the signal processing unit 145c may output a previous value and a subsequent value of a sensing signal so as to check a change in the sensing signal. The previous values are indicated by a dotted line, and the subsequent values are indicated by a solid line.

The signal processing unit 145c outputs a previous value and a subsequent value of a sensing signal of the first sensor with respect to the On status and the Off status of each of the second to fourth sensors so as to determine presence or absence of an obstacle depending on a change in the sensing signal.

When light other than signals from the second to fourth sensors are incident on the first sensor, the first sensor is able to sense the light since the first sensor is a photodiode.

Accordingly, the signal processing unit 145c outputs a previous value and a subsequent value of a signal received by the first sensor depending on the On/Off status of each of the second to fourth sensors, and the signal processing unit 145c determines, based on the change in the received signal, whether the received signal is a signal which is transmitted from any one of the second to fourth sensors and then reflected by an actual obstacle or whether the received signal is a signal received in response to external light.

In the case where no signal is incident on the first sensor, there is only a little difference between the previous value and the subsequent value, and, in the case where a signal from any one of the second to fourth sensors is incident on the first sensor due to the presence of an actual obstacle, there is a big difference between the previous value and the subsequent value.

For example, in the case where no signal from the second to fourth sensor is incident due to absence of an obstacle, the difference between the previous value and the subsequent value is equal to or smaller than 100, and, in the case where a signal from any one of the second to fourth sensor is incident on the first sensor due to presence of an obstacle, there is a big difference therebetween. In addition, in the case of a light absorbing material (e.g., block), reflected and incident light has low strength, and thus, based on this characteristic, determination as to presence or absence of an obstacle may be made.

Accordingly, as illustrated in (a) to (c) of FIG. 10, detection of an obstacle and no detection of any obstacle are distinguished depending on a distance measurable by a sensor. A strong signal is measured in a range from 10 mm to 20 mm in (a) of FIG. 10, and a high value is measured in a range from 20 mm to 33 mm in (b) of FIG. 10, and a high value is measured in a range from 30 mm to 58 mm in (c) of FIG. 10. As such, different values may be used to estimate a distance.

Figure 11:
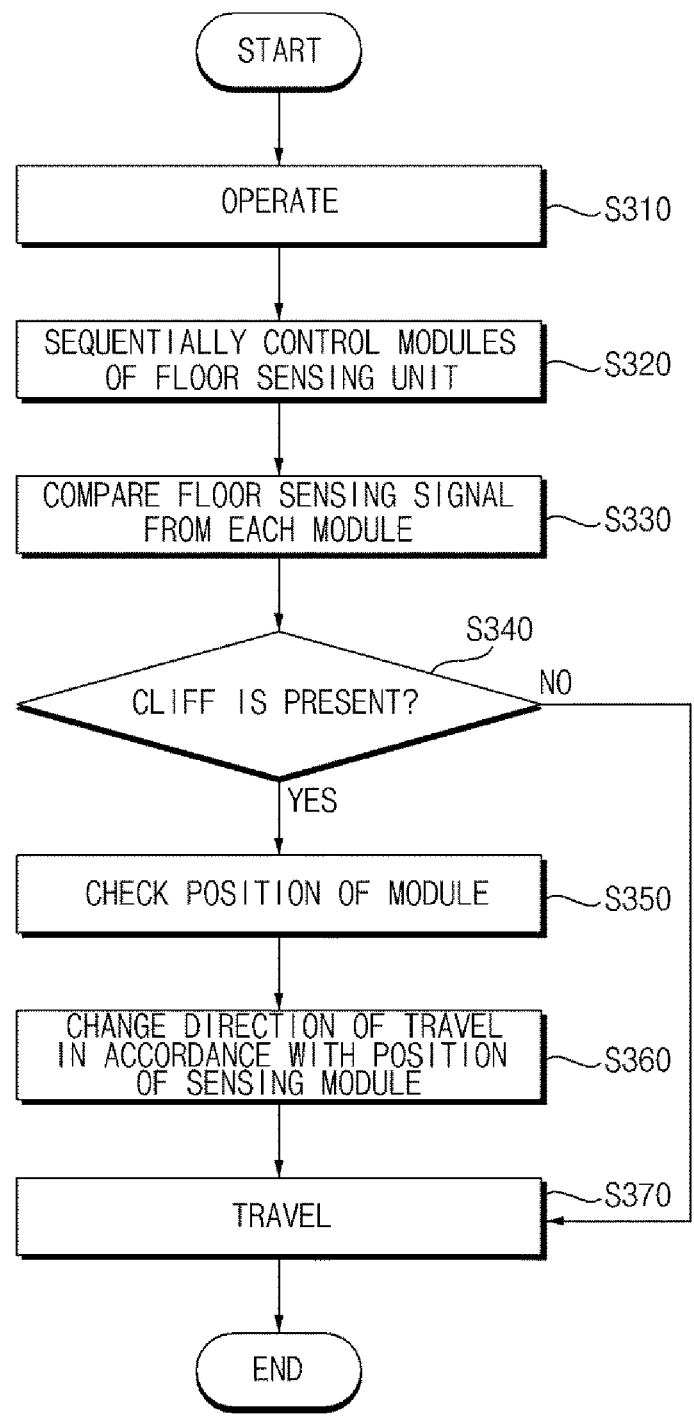
FIG. 11 is a diagram illustrating a method of operating a moving robot according to the present invention.

FIG. 11 is a diagram illustrating a method of operating a moving robot according to the present invention.

As illustrated in FIG. 11, the moving robot cleans a predetermined area in accordance with a setting received through the operation unit 137 (S310).

The floor determination unit 145 applies an operating signal to the first to third floor sensing units of the floor sensing unit 160 and sequentially controls operations thereof (S320).

When an operating signal is applied from the MCU 145a of the floor determination unit 145 to the MUX 145b, the MUX 145b selects one of the first to third floor sensing units of the floor sensing unit 160 and applies the operating signal to the selected floor sensing unit. The MCU 145a periodically generates an operating signal and applies the generated operating signal to the MUX 145b, and the MUX 145b sequentially selects one of the first to third floor sensing units and applies the operating signal to the selected floor sensing unit. Accordingly, any one of the second to fourth sensors in each module of the floor sensing unit 160 operates in accordance with the operating signal, and a signal from the any one of the second to fourth sensors is incident on the first sensor depending on a state of a floor. When a signal is incident on the first sensor, a sensing signal of the first sensor is input to the floor determination unit 145. In this case, the sensing signal is input to the signal processing unit 145c, and the signal processing unit converts the sensing signal in an analog format into a digital signal and inputs the digital signal to the MCU.

The floor determination unit 145 determines the state of the floor based on data received from the first to third floor sensing units, that is, a floor sensing signal, and compares a floor sensing signal from each module (S330).

The floor determination unit 145 determines whether a cliff is present, by determining the of the floor based on a floor sensing signal (S340). In this case, whether a cliff is present is determined by a floor sensing signal from any one of the first to third floor sensing units, the floor determination unit 145 checks a position of a module from which the signal has been received.

The floor determination unit 145 applies data on the determination as to the cliff and the position of the module to the travel controller 141, and the travel controller 141 changes a direction of travel depending on the position of the module which has sensed the cliff (S360).

The travel controller 141 applies a control signal to the motor 139 in accordance with the changed direction of travel, and the moving robot 100 travels in the changed direction of travel (S370).

Figure 12:
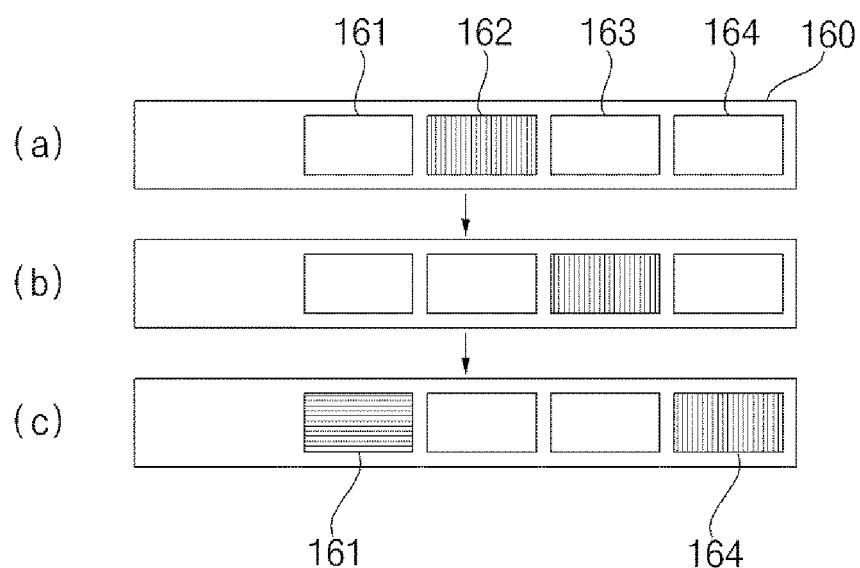
FIGS. 12 and 13 are diagrams illustrating an example of sensing an obstacle a moving robot according to the present invention.
Figure 13:
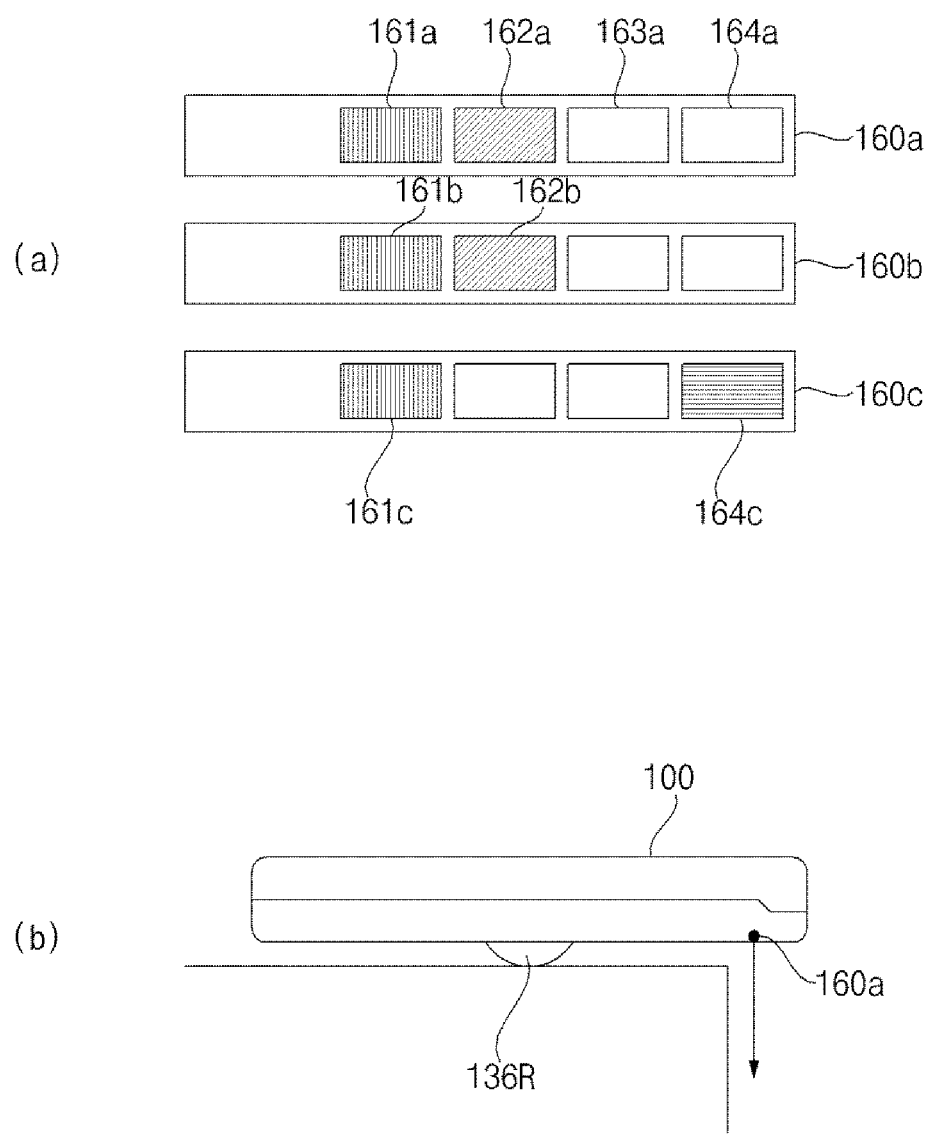

FIGS. 12 and 13 are diagrams illustrating an example of sensing an obstacle of a moving robot according to the present invention.

As illustrated in FIG. 12, the floor sensing unit 160 includes first to third floor sensing units each including first to fourth sensors 161 to 164. As described above, the first sensor 161 is a receiver, and the second to fourth sensors 162 to 164 are transmitters.

Sequentially, the second sensor 162 operates as illustrated in (a) of FIG. 12, the third sensor 163 operate as illustrated in (b) of FIG. 12, and the fourth sensor 164 operates as illustrated in (c) of FIG. 12.

In (a) and (b) of FIG. 12, the first sensor 161 does not sense a signal and thus it is found that an object is not sensed by the second sensor and the third sensor. Meanwhile, as illustrated in (c) of FIG. 12, when the fourth sensor 164 operates, a signal may be sensed by the first sensor 161. The second sensor is for sensing an obstacle, such as a door threshold, the third sensor is for sensing a normal state, the fourth sensor is for sensing an obstacle at a long distance, and, when no signal is sensed by the second to fourth sensors, this means that a cliff is present.

Thus, in accordance with a floor sensing signal from the fourth sensor, the floor determination unit 145 determines a long-distance state and inputs data to the travel controller, such that the travel controller maintains a direction of travel.

If no signal is sensed by the first sensor even though the second to fourth sensors operate, the floor determination unit 145 may immediately determine that a cliff is present. In this case, the travel controller changes the direction of travel.

In addition, if no floor sensing signal is not received from the first sensor for a predetermined period of time or longer, the floor determination unit 145 may determine a sensor malfunction and output an error.

As illustrated in (a) of FIG. 13, the floor sensing unit 160 may sense a signal from each module. That is, as the first to third floor sensing units operate sequentially, not simultaneously, the drawing illustrates the case where signals are sensed by respective first sensors of the first to third floor sensing units in a predetermined period of time.

For example, the first floor sensing unit 160a may sense a signal by a first sensor 161a when the fourth sensor 164a operates, the second floor sensing unit 160b may sense a signal by a first sensor 161b when the third sensor 163b operates, and the third floor sensing unit 160c may sense a signal by a first sensor 161c when the third sensor 163c operates.

In accordance with a floor sensing signal from each module, the floor determination unit 145 determines a normal state with respect to the second floor sensing unit and the third floor sensing unit, and a long-distance state with respect to the first floor sensing unit. In some cases, the second floor sensing unit or the third floor sensing unit may sense an obstacle by the second sensor.

In the case where the moving robot passes a door threshold or an obstacle present on the floor, the main body 110 is tilted and thus the front part of the moving robot is raised up, thereby increasing a distance to the floor. The fourth sensor senses a state like this.

Thus, the floor determination unit 145 determines a long-distance state with respect to a direction of travel and applies data to the travel controller 141, and the travel controller 141 performs control so as to keep traveling in the direction of travel.

As illustrated in (b) of FIG. 13, in the case where a cliff is present ahead, a signal is not sensed by the first sensor even though the floor sensing unit 160 operates the second to fourth sensors sequentially.

When no signal is sensed by the second to fourth sensors of the first floor sensing unit, the floor determination unit 145 determines that a cliff is present.

That is, it is determined that the right side of the moving robot 100 with the second floor sensing unit installed therein and the left side of the moving robot 100 with the third floor sensing unit installed therein are in a normal state, and that the front side of the moving robot with the first floor sensing unit installed therein is a cliff is present.

Accordingly, the travel controller 141 controls the moving robot to travel by changing the direction of travel. In this case, if the moving robot 100 rotates on the spot to the left, a cliff may be sensed by the second floor sensing unit.

As such, in the present invention, a plurality of sensors are installed at different angles and senses objects located at different distances to a floor, thereby enabled to distinguish an obstacle present on the floor, a normal state, and a cliff. Accordingly, even though a distance to the floor is temporarily increased due to presence of an obstacle such as a door threshold, the moving robot may keep traveling without sensing of the distance as a cliff and thus perform cleaning by moving over the door threshold. In addition, as floor sensing units are installed at a plurality of positions, the position of an obstacle or a cliff may be determined more accurately.

Although exemplary embodiments of the present disclosure have been described for illustrative purposes, those skilled in the art will appreciate that various modifications, additions and substitutions are possible, without departing from the scope and spirit of the disclosure.

What is claimed is:

1. A moving robot comprising:
   a movable main body;
   a travel drive unit configured to move the main body;
   a floor sensing unit installed at a bottom of the main body, the floor sensing unit comprising:
      a plurality of transmitters configured to transmit signals in different directions with respect to a floor;
      a single receiver configured to receive any one of the signals transmitted from the plurality of transmitters; and
   a controller configured to determine a distance from a bottom surface of the main body to the floor based on whether the receiver has received the signal transmitted from any one transmitter among the plurality of transmitters, determine a travel path based on a state of the floor corresponding to the determined distance, and control the travel drive unit based on the travel path.

2. The moving robot of claim 1, wherein the plurality of transmitters are configured to transmit signals sequentially, and
   wherein the receiver comprises a first sensor configured to sense incidence of any one of the signals transmitted from the plurality of transmitters.

3. The moving robot of claim 2,
   wherein the first sensor is a photodiode, and
   wherein the plurality of transmitters comprises light emitting diodes.

4. The moving robot of claim 2, wherein the receiver is further configured to, when the signal transmitted from any one of a first transmitter, a second transmitter, or a third transmitter included in the plurality of transmitters is incident on the first sensor, input a floor sensing signal to the controller.

5. The moving robot of claim 4, wherein the first transmitter, the second transmitter, and the third transmitter included in the plurality of transmitters sequentially transmit signals in a predetermined order.

6. The moving robot of claim 1, wherein the plurality of transmitters include a first transmitter that is installed such that, when the signal from the first transmitter is reflected within a first distance to a second distance from the bottom surface of the main body, the signal from the first transmitter is incident on the receiver.

7. The moving robot of claim 6, wherein the floor sensing unit is further configured to, when the signal transmitted from the first transmitter is incident on the receiver, determine that the state of the floor is a flat floor.

8. The moving robot of claim 6, wherein the plurality of transmitters include a second transmitter that is installed such that, when the signal from the second transmitter is reflected within a third distance to a fourth distance that are each shorter than the second distance, the signal is incident on the receiver.

9. The moving robot of claim 8, wherein the floor sensing unit is further configured to, when the signal transmitted from the second transmitter is incident on the receiver, determine that an obstacle is present on the floor.

10. The moving robot of claim 8, wherein the floor sensing unit is further configured to, when the signal from the second transmitter is incident while a signal from the first transmitter is incident on the receiver, determine that an obstacle is present on a flat floor.

11. The moving robot of claim 8, wherein the floor sensing unit is further configured to, when the signal from the first transmitter is incident while the signal from the second transmitter is incident on the receiver, determine that the moving robot arrives at a flat floor after moving over an obstacle.

12. The moving robot of claim 6, the plurality of transmitters include a third transmitter that is installed such that, when the signal from the third transmitter is reflected within a fifth distance to a sixth distance that are each shorter than the second distance from the bottom surface of the main body, the signal is incident on the receiver.

13. The moving robot of claim 12, wherein the floor sensing unit is further configured to, when the signal transmitted from the third transmitter is incident on the receiver, determine that the floor is located at a long distance from the main body or that the main body is tilted.

14. The moving robot of claim 12, wherein the floor sensing unit is further configured to, when the signal from the third transmitter is incident while the signal from the first transmitter is incident on the receiver, determine that the main body is tilted or that the floor is located a long-distance from the main body.

15. The moving robot of claim 12, wherein the floor sensing unit is further configured to, when a signal from the first transmitter is incident while the signal from the third transmitter is incident on the receiver, determine that the main body returns back to a normal state.

16. The moving robot of claim 12, wherein the floor sensing unit is further configured to, when the signal from the second transmitter and a signal from the third transmitter is incident sequentially while the signal from the first transmitter is incident on the receiver, determine that the main body is tilted by an obstacle present on a flat floor.

17. The moving robot of claim 1, wherein the floor sensing unit further comprises a sensor case which protects the plurality of transmitters and the receiver, and which is provided with a guide such that the signals transmitted from the plurality of transmitters respectively form predetermined angle relative to the floor.

18. The moving robot of claim 1, wherein the plurality of transmitters is installed at different angles relative to the floor.

19. The moving robot of claim 1, wherein the controller is further configured to, when any of the signals transmitted from the plurality of transmitters is not sensed by the receiver, determine that the state of the floor is a cliff.

20. The moving robot of claim 1, wherein the controller is further configured to:
when it is determined in accordance with the floor sensing signal that the state of the floor is one of an obstacle, a flat floor, or a long-distance state, maintain a travel setting; and
when it is determined that the state of the floor is a cliff, change a direction of travel.

21. The moving robot of claim 1,
wherein the floor sensing unit comprises:
a first floor sensing unit installed at a front lower end of the main body;
a second floor sensing unit installed at a right lower end of the main body; and
a third floor sensing unit installed at a left lower end of the main body,
wherein each of the first to third floor sensing units comprises the receiver and the plurality of transmitters, and
wherein the controller is further configured to determine a state of the floor around the main body in accordance with a floor sensing signal received from each of the first to third floor sensing units.

22. The moving robot of claim 21, wherein the controller is further configured to generate an operating signal and transmit the operating signal to any one of the first to third floor sensing units such that the first to third floor sensing units operate sequentially.

23. The moving robot of claim 22, wherein the controller is further configured to, when a cliff is sensed by the floor sensing signal from any one of the first to third floor sensing units, set a direction of travel by determining a position of the cliff based on positions of the first to third floor sensing units.

24. The moving robot of claim 22,
wherein the controller comprises a floor determination unit configured to control the floor sensing unit and determine the state of the floor in accordance with the floor sensing signal, and
wherein the floor determination unit comprises:
a micro control unit (MCU) configured to apply the operating signal to the floor sensing unit;
a multiplexer (MUX) configured to select any one of the first to third floor sensing units and apply the operating signal to the selected floor sensing unit; and
a signal processing unit configured to filter noise in a sensing signal received from the receiver, convert the sensing signal into a digital signal, and input the digital signal to the MCU.

25. A control method of a moving robot, comprising:
transmitting signals in different directions with respect to the floor using a plurality of transmitters during traveling along a floor,
when any one of the signals transmitted from the plurality of transmitters is sensed by a receiver, determining a state of the floor based on which transmitter among the plurality of transmitters transmitted the signal received by the receiver; and
determining a travel path based on the state of the floor.

26. The control method of claim 25, wherein the plurality of transmitters transmit the signals sequentially.

27. The control method of claim 25, wherein the plurality of transmitters transmits the signals sequentially in a predetermined order in accordance with an input operating signal.

28. The control method of claim 25, further comprising, when the signals from the plurality of transmitters are not sensed by the receiver, determining that the state of the floor is a cliff.

29. The control method of claim 25, wherein determining the state of the floor includes:
when a signal from the first transmitter of the plurality of transmitters is incident on the receiver, determining that the state of the floor is a flat floor;
when a signal from the second transmitter of the plurality of transmitters is incident on the receiver, determining that an obstacle is present on the floor; and
when a signal transmitted from the third transmitter of the plurality of transmitters is incident on the receiver, determining that the floor is located at a long distance from a main body of the moving robot or that the main body is tilted.

30. The control method of claim 29, wherein determining the state of the floor includes:
when the signal from the second transmitter is incident while the signal from the first transmitter is incident on the receiver, determining that an obstacle is present on a flat floor;
when the signal from the third transmitter is incident while the signal from the first transmitter is incident on the receiver, determining that the main body is tilted by an obstacle or that the floor is a long-distance from the moving robot;
when the signal from the first transmitter is incident while the signal from the second transmitter is incident on the receiver, determining that the moving robot arrives at a flat floor after moving over an obstacle;
when the signal from the first transmitter is incident while the signal from the third transmitter is incident on the receiver, determining that the main body returns back to a normal state; and
when the signal from the second transmitter and the signal from the fourth third transmitter are incident sequentially while the signal from the first transmitter is incident on the receiver, determining that the main body is tilted by an obstacle present on a flat floor.

31. The control method of claim 25, wherein determining a travel path based on the state of the floor includes:
receiving a floor sensing signal corresponding to the state of the floor from first to third floor sensing units installed at a plurality of positions; and
in accordance with the floor sensing signal received from the first to third floor sensing units, determining the state of the floor,
wherein each of the first to third floor sensing units comprises the receiver and the plurality of transmitters.

32. The moving method of claim 31, further comprising, in accordance with an operating signal applied to any one of the first to third floor sensing units, sequentially operating the first to third floor sensing units.

33. The control method of claim 31, further comprising, when the state of the floor is a cliff, determining a position of the cliff in correspondence with a position of at least one of the first to third floor sensing units from which the floor sensing signal has been received, and setting a direction of travel based on the position of the cliff.

* * * * *